US006871385B2

(12) United States Patent
Wing et al.

(10) Patent No.: US 6,871,385 B2
(45) Date of Patent: Mar. 29, 2005

(54) REFRIGERATOR HANDLE MOUNTING ARRANGEMENT

(75) Inventors: Forrest F. Wing, Des Moines, IA (US); Michael J. Eveland, Cedar Rapids, IA (US); Thomas E. Gose, Cedar Rapids, IA (US)

(73) Assignee: Maytag Corporation, Newton, IA (US)

( * ) Notice: Subject to any disclaimer, the term of this patent is extended or adjusted under 35 U.S.C. 154(b) by 42 days.

(21) Appl. No.: 10/195,446

(22) Filed: Jul. 16, 2002

(65) Prior Publication Data

US 2004/0010888 A1 Jan. 22, 2004

(51) Int. Cl.[7] .................................................. B62B 1/00
(52) U.S. Cl. .......................................................... 16/436
(58) Field of Search .................... 16/DIG. 19, DIG. 24, 16/422, 425, 430, 436, DIG. 18, DIG. 25, 110.1, 111.1, 413, 412; 248/224.61, 220.21, 316.2

(56) References Cited

U.S. PATENT DOCUMENTS

| | | | | |
|---|---|---|---|---|
| 2,175,632 A | | 10/1939 | Maga | |
| 2,234,097 A | * | 3/1941 | Tinnerman | 403/257 |
| 2,472,479 A | * | 6/1949 | Hoff | 16/413 |
| 3,426,385 A | | 2/1969 | Gutshall | |
| 3,766,598 A | | 10/1973 | Roberts | |
| 3,995,349 A | | 12/1976 | Roberts et al. | |
| 4,087,141 A | | 5/1978 | Roberts | |
| 4,540,207 A | * | 9/1985 | Klasen et al. | 292/341.17 |
| 4,745,656 A | | 5/1988 | Revlett | |
| 4,912,809 A | * | 4/1990 | Scheuer | 16/413 |
| 4,922,576 A | | 5/1990 | Weidner et al. | |
| 5,193,244 A | | 3/1993 | Meyers | |
| 5,303,445 A | | 4/1994 | Meyers | |
| 5,402,553 A | * | 4/1995 | Goetz et al. | 16/413 |
| 5,493,756 A | * | 2/1996 | Shanok et al. | 16/412 |
| 5,659,927 A | | 8/1997 | Shanok et al. | |
| 5,675,867 A | | 10/1997 | Howie, Jr. | |
| 5,740,587 A | | 4/1998 | Onai et al. | |
| 5,797,164 A | | 8/1998 | Donaghy | |
| 6,450,364 B1 | * | 9/2002 | Nam | 220/759 |
| 6,609,274 B2 | * | 8/2003 | Christensen et al. | 16/412 |
| 6,629,339 B2 | * | 10/2003 | Pohl et al. | 16/436 |
| 2003/0079313 A1 | * | 5/2003 | Pohl et al. | 16/436 |

FOREIGN PATENT DOCUMENTS

| | | | |
|---|---|---|---|
| JP | 03-031684 | | 2/1991 |
| JP | 2001-50651 | * | 2/2001 |
| JP | 2001-336872 | | 12/2001 |

* cited by examiner

*Primary Examiner*—Anthony Knight
*Assistant Examiner*—Andre' L. Jackson
(74) *Attorney, Agent, or Firm*—Diederiks & Whitelaw, PLC

(57) ABSTRACT

A refrigerator handle assembly includes a plurality of base members which are initially attached at spaced longitudinal positions to a front face portion of a refrigerator door, with tab elements of the base members extending into openings formed in the door and screws fixing the base members in place. The base members also include hook elements having tapered and angled portions. Once the base members are secured, sections of the handle are placed over the base members and the handle is slid relative to the base members whereupon the hook elements co-act with structure on the handle such that the handle is drawn tight to the front face portion of the door. With the handle in this position, one or more mechanical fasteners are driven into a body portion of the handle and into the door.

20 Claims, 5 Drawing Sheets

REFRIGERATOR HANDLE MOUNTING ARRANGEMENT

BACKGROUND OF THE INVENTION

1. Field of the Invention

The present invention pertains to the art of refrigerators and, more particularly, to a mounting arrangement for a handle on a refrigerator.

2. Discussion of the Prior Art

Conventional handle arrangements for refrigerators are formed from multiple pieces, including a handle frame and a handle piece having a gripping portion. Such a handle is typically mounted to a refrigerator cabinet utilizing screws which extend through the handle piece and frame, clamping the overall handle to a panel of the refrigerator cabinet. Once the handle is in place, a cover is inserted over the screw, with the cover extending only over the area of the screws or along substantially the entire length of the handle. In general, this known handle mounting arrangement is rather hard to assemble and often results in witness lines that take away from the overall aesthetics of the refrigerator.

In certain refrigerators, gas assist handles are employed in an attempt to simplify the construction and assembly, while also improving the aesthetics. Such handle arrangements are also considered advantageous given their characteristic soft feel. These types of handles are also typically secured by securing upper and lower handle extensions directly to the door face, again typically through the use of mechanical fasteners.

Regardless of the existence of various types of refrigerator handle arrangements and mounting systems therefor, there still exists a need in the art for an improved refrigerator handle mounting arrangement preferably, but certainly not limited to, surface mounting a handle to a refrigerator in a manner which provides a tight, aesthetically appealing and easily assembled overall arrangement.

SUMMARY OF THE INVENTION

The present invention pertains to the mounting of a handle to a door panel face of a refrigerator. In accordance with the most preferred form of the invention, a plurality of base fastener members or pieces are initially attached at longitudinally spaced positions to the face of the refrigerator, preferably through the use of mechanical connections. The base pieces include angled portions which project from the front face of the refrigerator. Once the base pieces are secured, end portions of a handle are placed over the base pieces and then the handle is slid relative to the base pieces whereupon the angled portions co-act with structure of the handle such that a wedging action is developed to draw the handle tight to the door panel. With the handle in this position, one or more mechanical fasteners are used to fixedly secure the refrigerator handle to the door panel.

In accordance with a preferred embodiment of the invention, the base pieces define hook fasteners including oppositely opposing projecting tab and hook elements adapted to engage the face of the refrigerator door and the handle assembly respectively, with the hook elements defining the angled portions that co-act with the handle. Once each hook fastener is located on and secured to the face of the refrigerator door, a portion of the handle is placed over the hook fasteners and the entire handle is slid relative to the hook fasteners. Each hook element co-acts with corresponding structure on the handle such that, as the relative sliding action is performed, an interference fit is developed to keep the handle tight to the door panel. With the handle in position, two screws are driven into the door panel through a portion of the handle. A cover is then placed over the screws to hide the same.

Additional objects, features and advantages of the present invention will be more readily apparent from the following detailed description of preferred embodiments of the invention, when taken in conjunction with the drawings wherein like reference numerals refer to corresponding parts in the several views.

DETAILED DESCRIPTION OF THE PREFERRED EMBODIMENTS

Figure 1:
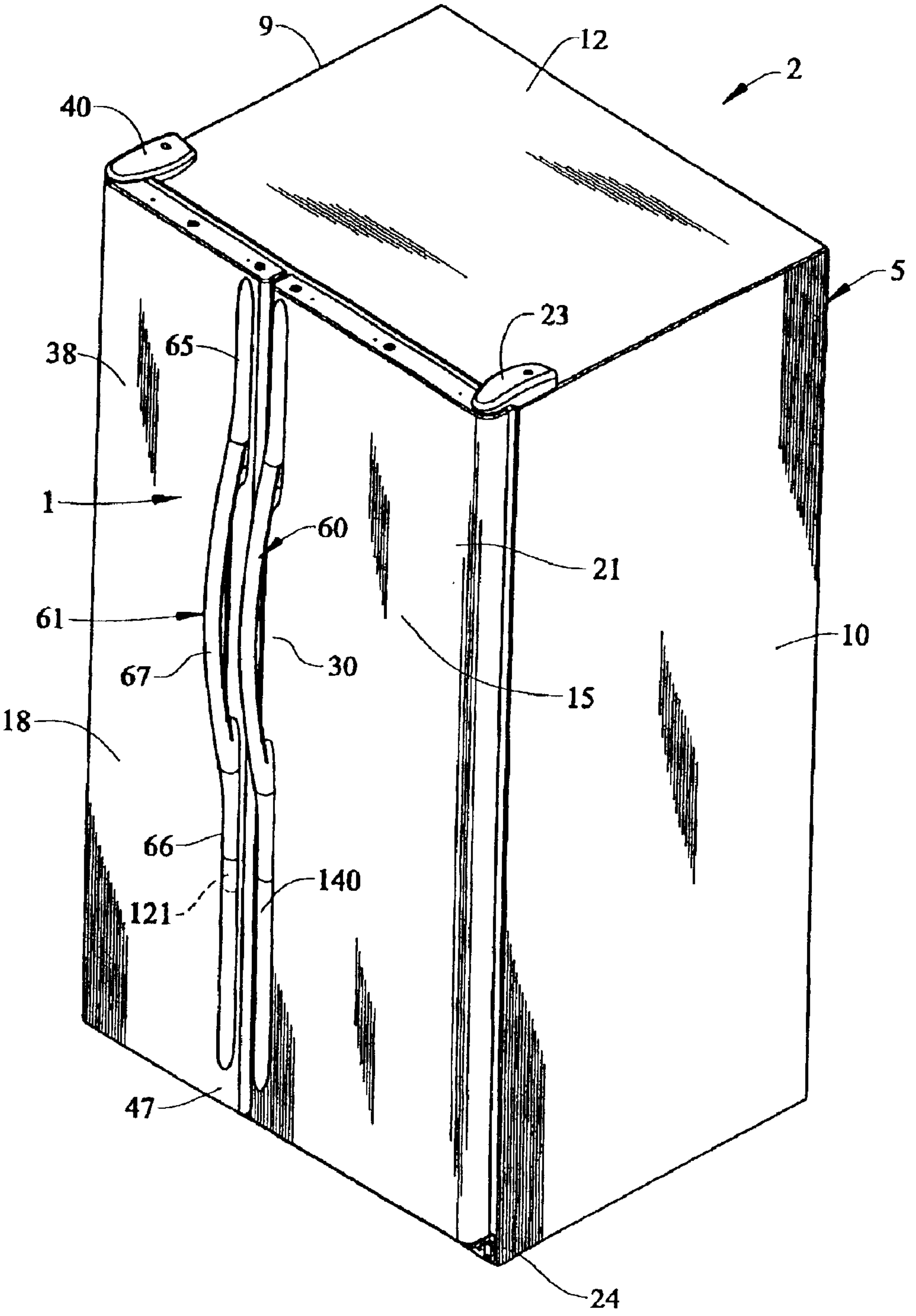
FIG. 1 is upper right front perspective view of a refrigerator cabinet incorporating a refrigerator door handle arrangement constructed in accordance with a preferred embodiment of the present invention.

With initial reference to FIG. 1, the handle arrangement 1 of the invention is shown mounted to a refrigerator cabinet which is generally indicated at 2. Although handle arrangement 1 can be applied to various different types and styles of refrigerators, as shown, refrigerator cabinet 2 includes a cabinet shell 5 formed from side panels 9 and 10 which are interconnected by a top panel 12. Preferably, cabinet shell 5 is formed from bending a single piece of sheet metal in a manner known in the art. As illustrated, refrigerator cabinet 2 constitutes a side-by-side refrigerator having a fresh food compartment door 15 which is arranged laterally juxtaposed to a freezer door 18. Aside from the aspects which will be described more fully below, the basic construction and operation of refrigerator cabinet 2 is known in the art, does not form part of the present invention, and therefore will not be discussed further herein.

Fresh food door 15 includes an outer vertical edge portion 21, which is pivotally attached to cabinet shell 5 through upper hinge 23 and a lower hinge 24, and an inner vertical edge portion 30. In a generally similar manner, freezer door 18 includes an outer edge portion 38, which is pivoted at upper hinge 40 and a lower hinge (not shown) for movement relative to cabinet shell 5, and an inner vertical edge portion 47. As known in the art, fresh food and freezer doors 15 and 18 conceal fresh food and freezer compartments of refrigerator cabinet 2. Again, the exact construction of refrigerator 2 can vary greatly without departing from the invention.

The present invention is actually directed to the mounting of handles 60 and 61 for fresh food and freezer doors 15 and 18 respectively. Although the particular handle configuration can vary in accordance with the present invention, it is the particular mounting arrangement for one or more handles, such as handles 60 and 61, to which the present invention is particularly directed. As shown, each handle 60, 61 includes a first, elongated end portion 65, a second end portion 66, and an intermediate portion 67 interconnecting first and second end portions 65 and 66. At this point, it should be understood that the exact configuration of handles 60 and 61 merely represents a preferred arrangement and various handle designs could be readily employed without departing from the invention.

Figure 2:
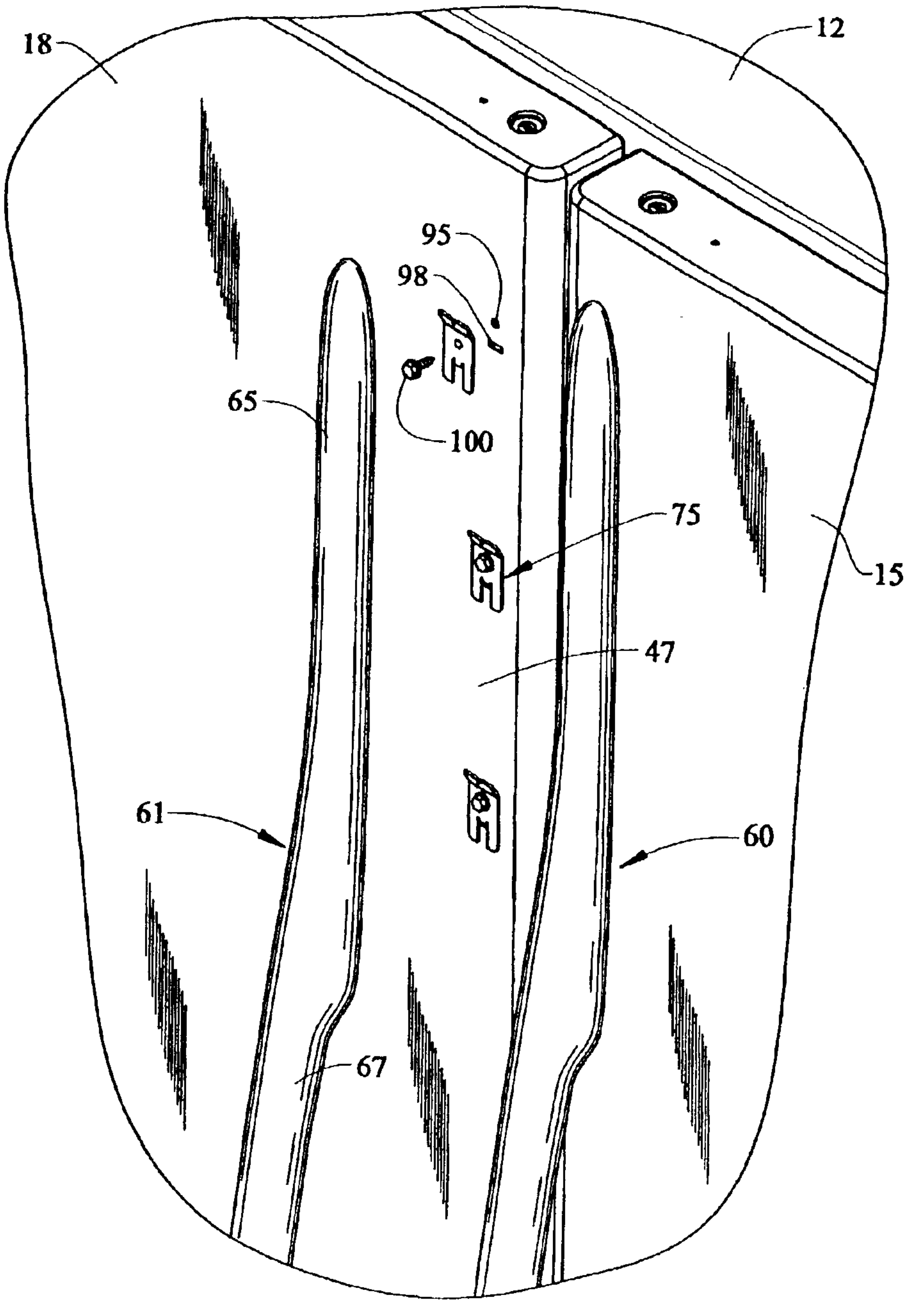
FIG. 2 is a partial exploded view of an upper portion of the handle arrangement of FIG. 1.
Figure 3:
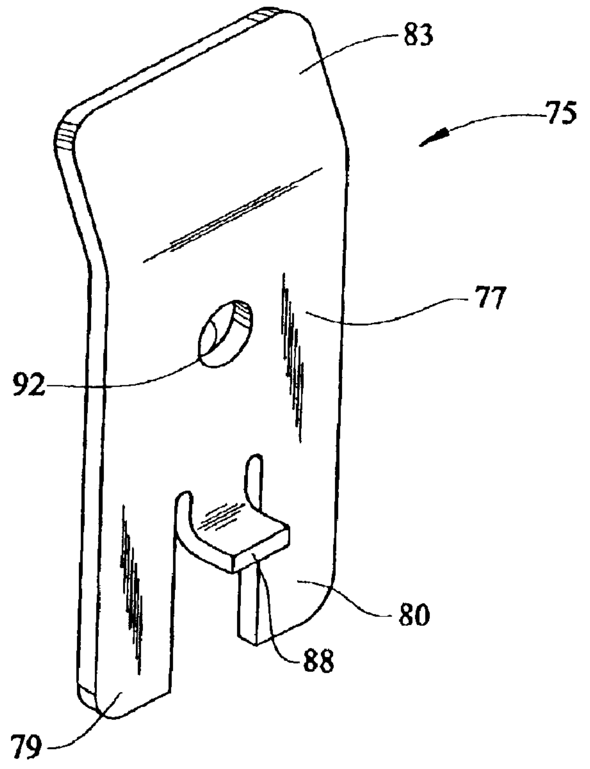
FIG. 3 is an enlarged perspective view of a base member employed in the handle arrangement of FIGS. 1 and 2.
Figure 4:
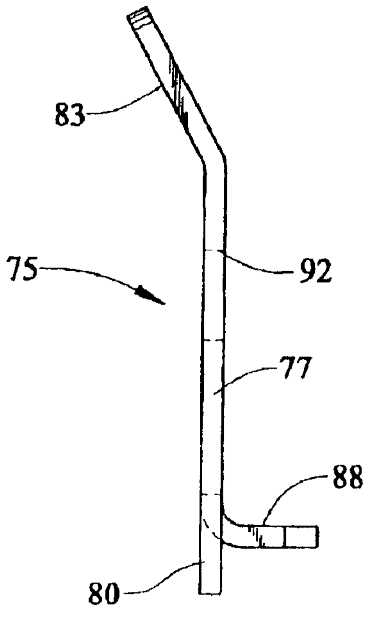
FIG. 4 is side view of the base member of FIG. 3.

Reference will now be made to FIGS. 2–7 in describing the preferred mounting of handle 61 in accordance with the present invention and it is to be understood that handle 60 is constructed and mounted in a corresponding manner. With initial reference to FIG. 2, a plurality of base members 75 are initially mounted along inner edge portion 47 of freezer door 18. FIGS. 3 and 4 best illustrate that, in accordance with the most preferred form of the invention, each base member 75 includes a main base section 77 which defines a pair of spaced legs 79 and 80. Projecting from one end of main base section 77 at an acute angle, preferably in the range of 20–40° and, most preferably, at 30°, is a hook section 83. Projecting from another end of main base section 77, between legs 79 and 80, is a tab section 88. Main base section 77 is also provided with an aperture 92.

As represented in FIG. 2, inner edge portion 47 of freezer door 18 is provided with a plurality of vertically spaced holes 95 and openings 98. Most preferably, each opening 98 preferably takes the form of a slot. Actually, holes 95 and openings 98 are arranged in sets, with each set containing a single hole 95 and a single opening 98 for use in mounting a respective base member 75 to the front face portion of freezer door 18. More specifically, each base member 75 is arranged with tab section 88 projecting into a respective opening 98, with aperture 92 being aligned with a respective hole 95. Thereafter, a mechanical fastener 100, such as a sheet metal screw, extends through aperture 92 and hole 95, and into door 18 to fixedly secure base member 75 to door 18. As clearly shown in FIGS. 2, 5 and 6, the most preferred embodiment of the invention provides for the mounting of a total of four base members 75 to door 18, with three of the base members 75 being arranged juxtapose first end portion 65 and a single base member being provided at second end portion 66. However, at this point, it should be realized that the exact number and location of base members 75 can readily vary without departing from the invention.

Figure 6:
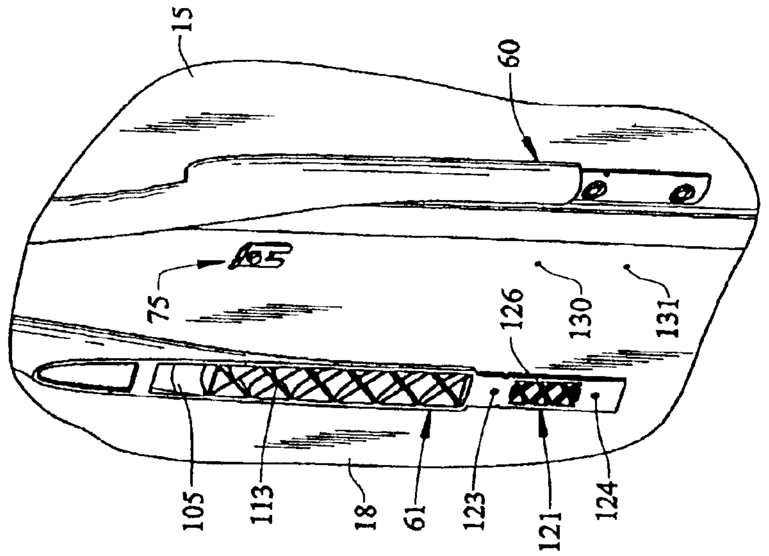
FIG. 6 is a partial exploded view of a lower portion of the overall handle arrangement.
Figure 5:
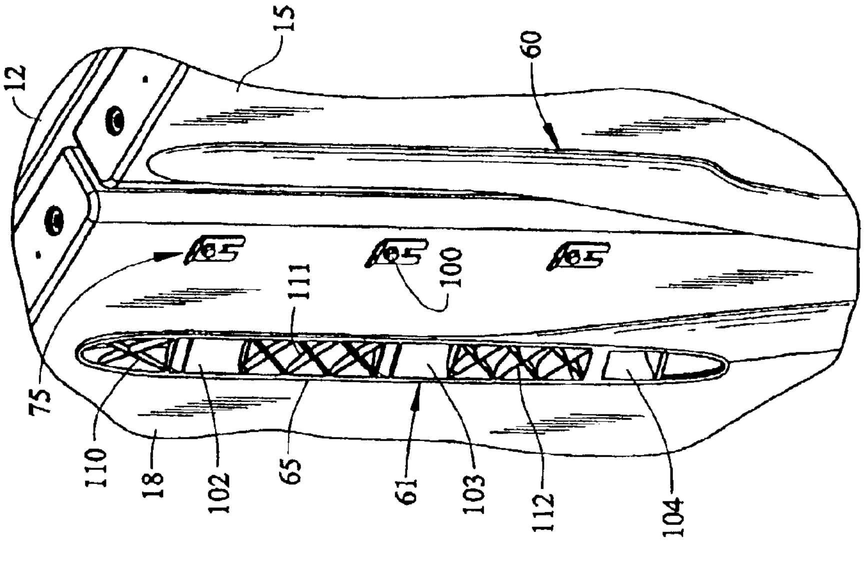
FIG. 5 is a partial exploded view similar to that of FIG. 2, but depicting a backside of the refrigerator handle.
Figure 7:
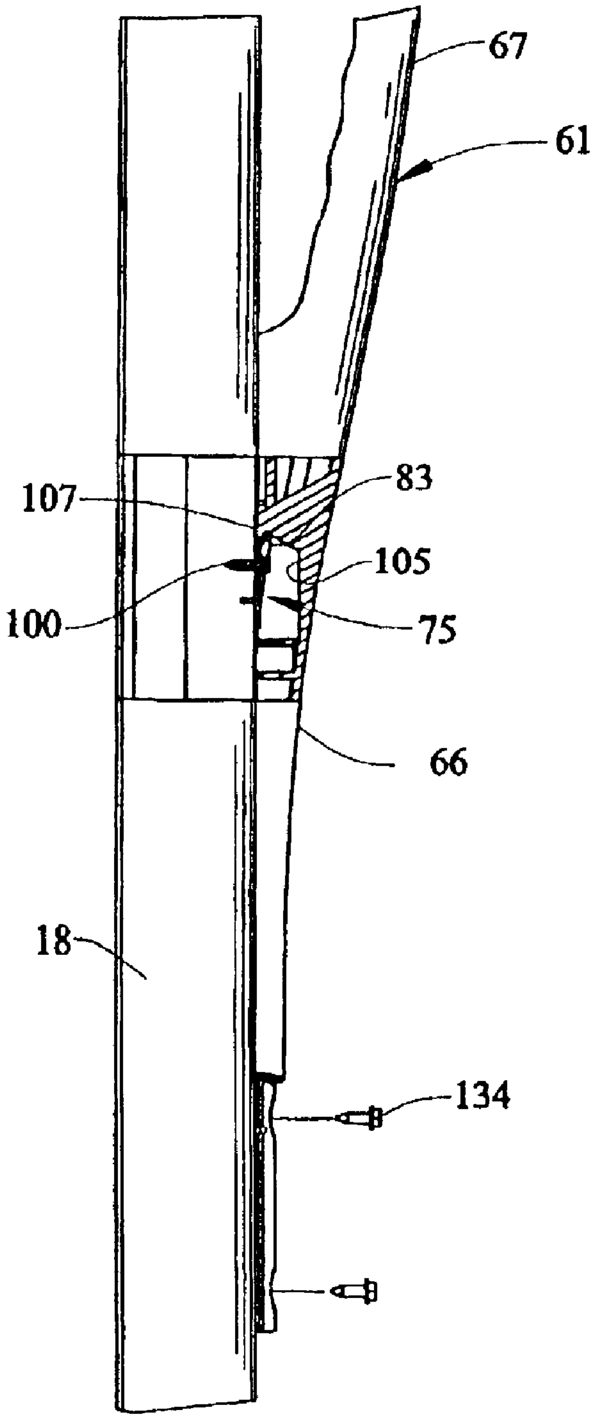
FIG. 7 is a cross-sectional side view of the lower portion of the handle arrangement.

As best shown in FIGS. 5–7, the underside of first end portion 65 of handle 61 is formed with a plurality of spaced, recessed sections 102–105, each of which defines a tapering undercut upper edge 107 (FIG. 7). Preferably provided adjacent recessed sections 102–104, which are shown spaced along first end portion 65 of handle 61, are a plurality of reinforced handle sections 110–112. In a similar manner, a reinforced handle section 113 is provided adjacent recessed section 105 in second end portion 66 of handle 61. Finally, a terminal end 121 of second end portion 66 is provided with a pair of spaced holes 123 and 124. Between holes 123 and 124 is interposed a reinforcement section 126.

With this arrangement, following the mounting of base members 75 to door 18 in the manner set forth above, first and second end portions 65 and 66 of handle 61 can be completely laid over base members 75, with each base member 75 being received within a respective one of recessed sections 102–105. Thereafter, the entire handle 61 is shifted or slid downward relative to base members 75. Due to the tapering of each of hook sections 83 and undercut edges 107, as handle 61 is shifted in this manner, a wedging action results and causes handle 61 is drawn against door 18. That is, base member 75 and handle member 61 include mating surfaces which co-act along tapered and angled portions thereof to draw handle 61 to the front face portion of door 18 upon shifting of handle 61 relative to base members 75. After handle 61 is shifted as described above, holes 123 and 124 become aligned with additional holes 130 and 131 provided in door 18, and mechanical fasteners 134 are used to fixedly secure handle 61 to door 18. Finally, a cap or cover member 140 (see FIG. 1) is snapped over terminal end 121 to cover mechanical fasteners 134 in order to complete the overall assembly. Cover member 140 preferably extends vertically well below terminal end 121 to provide symmetry to overall handle arrangement 1, while being attached to door 18 through an additional mechanical connection, such as a spring load mounting arrangement as known in the art (not shown).

With this handle mounting arrangement, handle 61 can be advantageously formed of plastic, and a tight, aesthetically appealing, as well as easily assembled, overall handle arrangement is defined. In any event, although described with reference to a preferred embodiment of the invention, it should be understood that various changes and/or modifications can be made without departing from the spirit of the invention. For instance, although described with reference to a side-by-side style refrigerator, a corresponding handle arrangement could be equally employed in a top or bottom mount style refrigerator as well. In any event, the invention is only intended to be limited in accordance with scope of the following claims.

We claim:

1. A refrigerator comprising:

a cabinet defining an interior compartment;

at least one door, having a front face portion, pivotally mounted to the cabinet for selectively accessing the compartment;

a handle assembly for pivoting the door relative to the cabinet, said handle assembly including:

a plurality of base members fixed to the door at spaced locations along the front face portion;

a handle member including first and second end portions separated by an intermediate portion, said first end portion being positioned over at least one of the base members and said second end portion being positioned over at least another one of the base members such that the first and second end portions of the handle member extend along the front face portion of the door, each of said plurality of base members and said handle member including mating surfaces which co-act along tapered portions thereof to draw said handle member to the front face portion of the door upon shifting of the handle member relative to the plurality of base members along the front face portion of the door; and at least one fastener for securing the handle member to the door, with the intermediate portion being spaced from the front side of the door to enable the handle to be grasped in order to selectively open and close the door.

2. The refrigerator according to claim 1, wherein the front face portion of the door is provided with a plurality of spaced openings, each of the base members including a tab element adapted to project into a respective one of the plurality of spaced openings.

3. The refrigerator according to claim 2, wherein the front face portion of the door further includes a plurality of holes adjacent corresponding ones of said plurality of spaced openings, said base members being further attached to the door at the openings.

4. The refrigerator according to claim 1, wherein each of the base members including a tab element and a hook element.

5. The refrigerator according to claim 4, wherein the handle member includes a plurality of spaced undercuts which define the mating surfaces.

6. The refrigerator according to claim 5, wherein the handle member is molded of plastic.

7. The refrigerator according to claim 1, wherein the at least one fastener extends through the second end portion of the handle member and into the door.

8. In a refrigerator including a cabinet defining an interior compartment and at least one door, having a front face portion, pivotally mounted to the cabinet for selectively accessing the compartment, a handle assembly for the door comprising:

a plurality of base members fixed to the door at space locations along the front face portion;

a handle member including first and second end portions separated by an intermediate portion, said first end portion being positioned over at least one of the base members and said second end portion being positioned over at least another one of the base members; and wedge means co-acting between said base members and said handle member for drawing said handle member to the front face portion of the door upon shifting of the handle member relative to the base member; and at least one fastener for securing the handle member to the door, with the intermediate portion being spaced from the front side of the door to enable the handle to be grasped in order to selectively open and close the door.

9. The handle assembly according to claim 8, wherein the front face portion of the door is provided with a plurality of spaced openings, each of the base members including a tab element adapted to project into a respective one of the plurality of spaced openings.

10. The handle assembly according to claim 9, wherein the front face portion of the door further includes a plurality of holes adjacent corresponding ones of said plurality of spaced openings, said base members being further attached to the door at the openings.

11. The handle assembly according to claim 8, wherein each of the base members includes a tab element and a hook element, said hook element defining part of said wedge means.

12. The handle assembly according to claim 11, wherein the handle member includes a plurality of spaced undercuts which define another part of the wedge means.

13. The handle assembly according to claim 8, wherein the handle member is molded of plastic.

14. The handle assembly according to claim 8, wherein the at least one fastener extends through the second end portion of the handle member and into the door.

15. A method of attaching a handle assembly to a front face portion of a refrigerator door comprising:

fixedly securing a plurality of base members at spaced locations along a portion of the front face portion of the door;

positioning a handle member over the plurality of base members;

slidably interconnecting the handle member to the plurality of base members while simultaneously drawing the handle member to the front face portion of the door; and mechanically fastening the handle member to the door, with an intermediate portion of the handle member being spaced from the front side of the door to enable the handle to be grasped in order to selectively open and close the door.

16. The method according to claim 15, wherein the handle member interacts with the plurality of base members along tapered surfaces to draw the handle member to the front face portion of the door upon slidably interconnecting the handle member to the plurality of base members.

17. The method according to claim 16, wherein each of the plurality of base members is attached to the door with a tab element provided on the base member extending into an opening formed in the front face portion of the door.

18. The method according to claim 17, wherein each of the plurality of base members are further attached to the door through a mechanical fastener.

19. The method according to claim 15, wherein the handle member is mechanically fastened to the door with at least one fastener extending through the handle member and into the door.

20. The method according to claim 15 wherein, when the handle member is positioned over the plurality of base members, the base members are received within recessed portions of the handle member.

* * * * *